United States Patent [19]

Dorleans

[11] Patent Number: 4,884,174
[45] Date of Patent: Nov. 28, 1989

[54] ATTACHMENT AND HINGING COMPONENT, ESPECIALLY FOR A DEVICE TO ADJUST AN OPTICAL ELEMENT, PARTICULARLY FOR A MOTOR VEHICLE HEADLIGHT

[75] Inventor: Guy Dorleans, Boulogne, France
[73] Assignee: Valeo Vision, Cedex, France
[21] Appl. No.: 190,821
[22] Filed: May 6, 1988
[51] Int. Cl.[4] .............................................. B60Q 1/00
[52] U.S. Cl. ..................................... 362/61; 362/421; 362/430; 362/287
[58] Field of Search ................... 362/421, 61, 80, 418, 362/430, 428, 273, 287

[56] References Cited

U.S. PATENT DOCUMENTS

| | | | |
|---|---|---|---|
| 4,306,276 | 12/1981 | Dick | 362/421 |
| 4,318,162 | 3/1982 | Sip | 362/61 |
| 4,503,486 | 3/1985 | Makita | 362/61 |
| 4,707,770 | 11/1987 | Van Puyh | 362/61 |
| 4,722,029 | 1/1988 | Ahle et al. | 362/80 |
| 4,757,428 | 7/1988 | Ryder et al. | 362/421 |
| 4,761,717 | 8/1988 | McMahan et al. | 362/80 |

FOREIGN PATENT DOCUMENTS 3238104  3/1984  Fed. Rep. of Germany ........ 362/61

Primary Examiner—Carroll B. Dority
Attorney, Agent, or Firm—Wenderoth, Lind & Ponack

[57] ABSTRACT

The attachment and hinging component (5) of the device for adjusting headlight (1) with respect to the intermediary mechanism plate (2) accommodates a swivel joint (24) disposed at one end of an adjustment screw (23), and is mounted freely in translation in a slot (17) placed on headlight (1). According to the invention, attachment and hinging component (5) is in the form of a base (50) comprising two rectilinear and mutually parallel grooves designed to engage on the edges of slot (17).

5 Claims, 2 Drawing Sheets

ATTACHMENT AND HINGING COMPONENT, ESPECIALLY FOR A DEVICE TO ADJUST AN OPTICAL ELEMENT, PARTICULARLY FOR A MOTOR VEHICLE HEADLIGHT

This invention pertains to an attachment and hinging component, especially for a device to adjust an optical element, particularly for a motor vehicle headlight.

BACKGROUND OF THE INVENTION

Devices to adjust motor vehicle headlights are generally composed of at least one fixed swivel joint solidary with a fixed support part, such as an intermediary mechanism plate or a collet, engaging in a concave seating of an attachment and hinging component, called the capsule, mounted on the element to be adjusted. An adjustment screw, screwing into the fixed support part, is endowed at one of its ends with a swivel joint engaging in a second concave seating of a second capsule, mounted on the element to be adjusted. Said adjustment is effected by manipulating the adjustment screw, which causes the component to be adjusted to pivot around its point(s) of attachment composed of the fixed swivel joint(s).

When the headlight is being adjusted, any point on the mobile part of the headlight defines a circle arc around its rotation axis, which, in the case of a device to adjust the height of the light beam, is broken down into a horizontal component along the axis of the adjustment screw, and a vertical component which is offset only by the deformation of various parts of the headlight and the adjustment device. This problem can cause elastic or permanent deformation of said parts, or the rupture thereof, and, in any case, increases the torque of the adjustment screw.

PRIOR ART

Through Patent Application GB-No. 2 023 276, an adjustment device as described above is known, in which a slot having an axis perpendicular to the axis of the adjustment screw, is placed on the headlight, so that an elastic element mounted on the end of the adjustment screw, pressing on the edges of the slot, allows a relative translation between said adjustment screw and the headlight in order to offset the vertical component of the circle arc defined by the headlight, with no deformation of any of the parts.

In such a device, since the elastic element is not guided, said element can be moved in rotation, which may cause the device to jam.

This invention implements an attachment and hinging component which is simple and consequently inexpensive, and also has the advantage of being guided in translation, in order to avoid the foregoing problem.

SUMMARY OF THE INVENTION

For this purpose, this invention involves an attachment and hinging component, especially for devices to adjust an optical element, particularly for motor vehicle headlights, with respect to a fixed support part, such as a mechanism plate or collet, intended to accommodate a swivel joint disposed at one end of an adjustment screw for the fixed support part, which is designed to engage in a concave seating of the attachment and hinging component, mounted freely in translation in a slot placed on the optical element, wherein the attachment and hinging component comprises a base having two rectilinear and mutually parallel grooves designed to engage on the edges of said slot and to guide said attachment and hinging component in translation during the adjustment operation.

BRIEF DESCRIPTION OF THE DRAWINGS

The description below constitutes an example embodiment of the invention and will illustrate more clearly how the invention can be assembled, with regard to the attached drawings, wherein.

DETAILED DESCRIPTION

Figure 1:
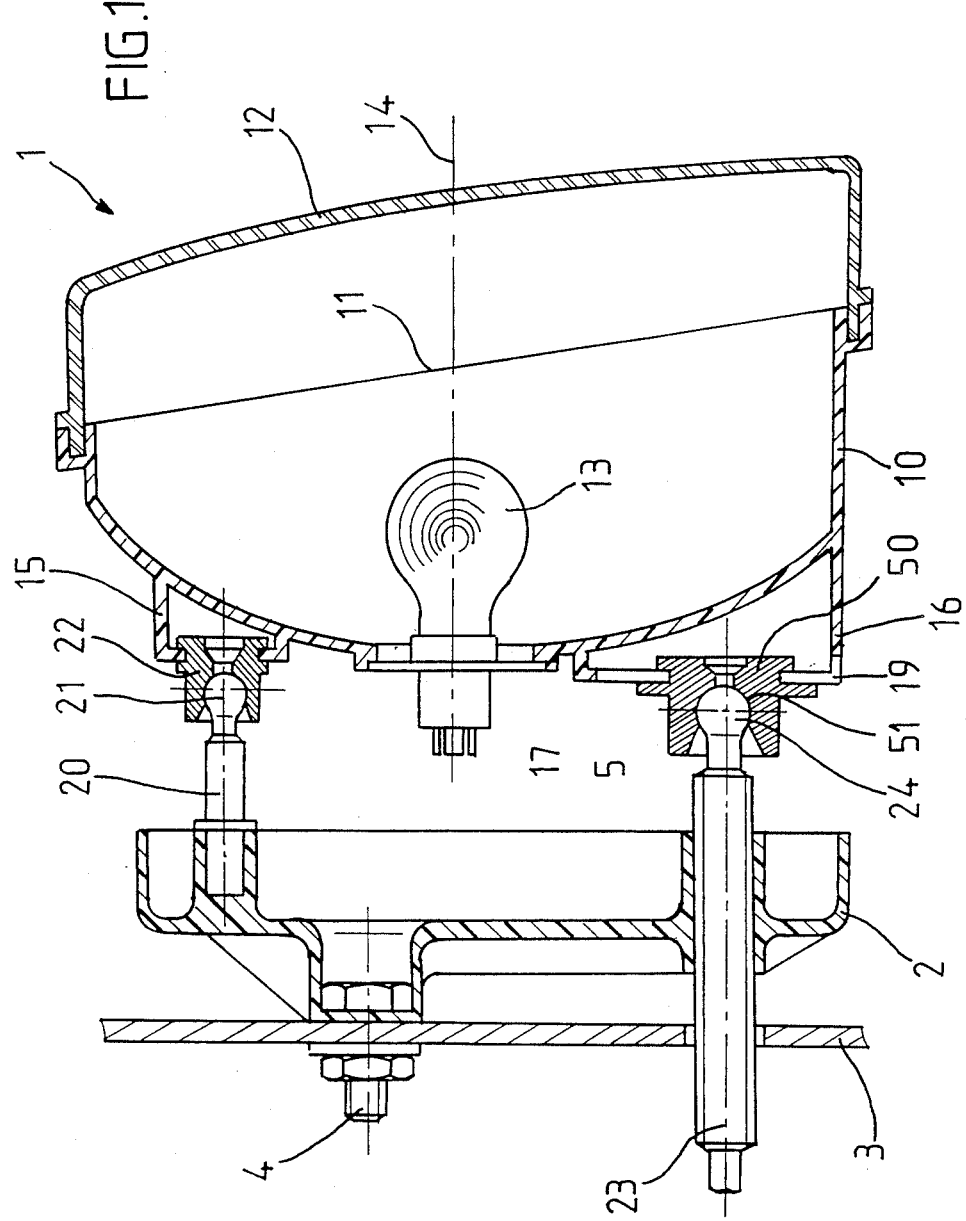
FIG. 1 is a cross section view of a headlight adjusting device endowed with an attachment and hinging component according to the invention.
Figure 2:
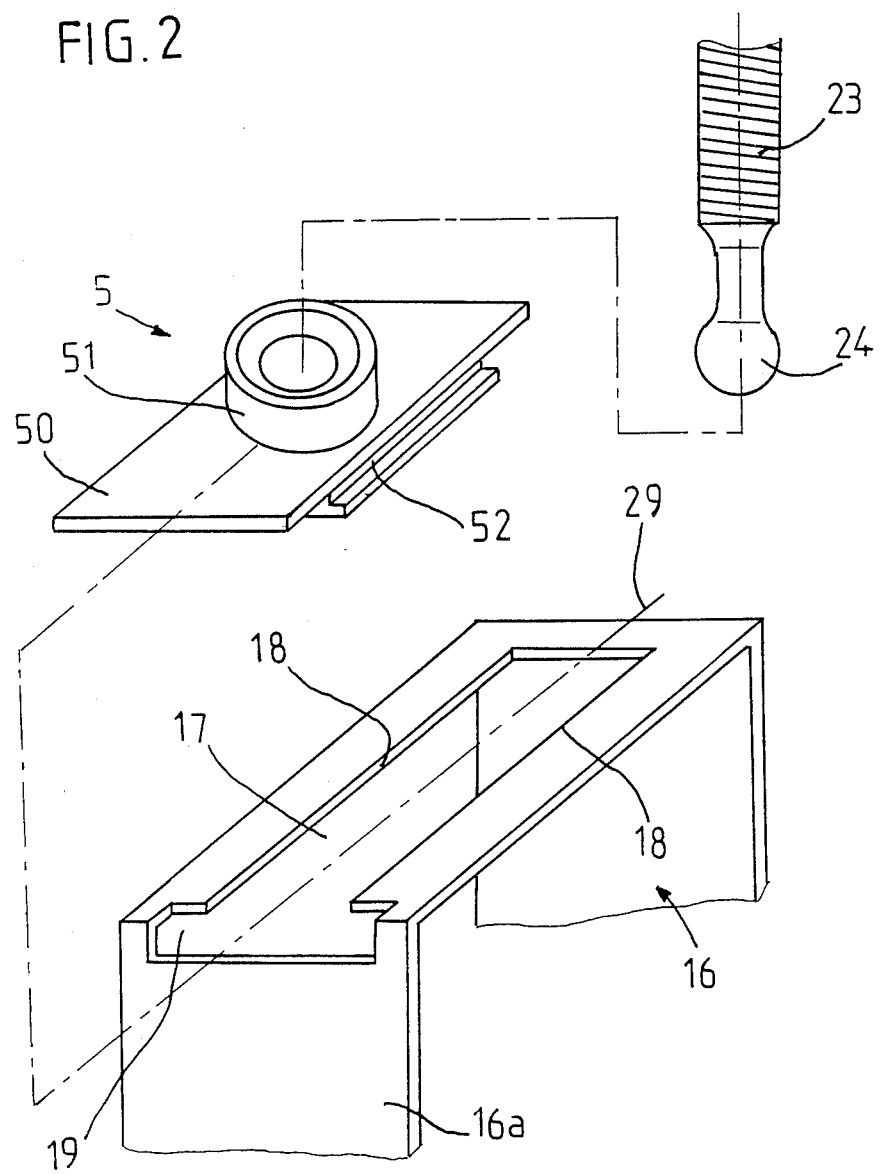
FIG. 2 is a perspective view of the mounting of an attachment and hinging component in a slot placed on a headlight, according to the invention.

A headlight 1 comprises a reflector 10 having a front opening 11 closed by a glass cover 12. A light source 13 is placed inside reflector 10 and projects a light beam towards the front of headlight 1 through glass cover 12 and approximately following axis 14 of headlight 1.

An intermediary mechanism plate 2 is attached to a body element 3 using bolts 4. Intermediary mechanism plate 2 comprises a device for attachment, hinging and adjustment of headlight 1 with respect to the body 3 of the vehicle it equips in order to adjust the height of the light beam emitted by headlight 1, with respect to axis 14 of said headlight 1.

Said device comprises a shaft 20 attached to the intermediary mechanism plate 2 and is endowed at its end with a fixed hinging swivel ball 21. Fixed hinging swivel ball 21 is housed in a concave seating placed in a capsule 22 fastened to reflector 10 by tabs 15 of reflector 10.

An adjustment screw 23 composed of a threaded shaft screwed into intermediary mechanism plate 2 comprises at its end directed towards reflector 10 a swivel ball 24 which is housed in a concave seating 51 placed in an attachment and hinging component 5.

Attachment and hinging component 5 is mounted on headlight 1, through the use of a bracket 16 connected to reflector 10, which comprises a longitudinal slot 17 extending perpendicularly in the form of a wider part 19 on lateral panel 16a of bracket 16.

Attachment and hinging component 5 is made unitary with a base 50 overmounted by concave seating 51 designed to accommodate swivel ball 24 placed at the end of adjustment screw 23. Base 50 is endowed on two of its opposite sides with rectilinear and mutually parallel grooves 52 allowing attachment and hinging component 5 to engage in slot 17 placed in bracket 16, by introduction into the widened perpendicular extension 19 of said slot 17, said extension being located on lateral panel 16a of bracket 16, so that each of the opposite edges 18 engages upon assembly in grooves 52 of base 50. Such an assembly thus allows attachment and hinging component 5 to translate during the adjustment operation along axis 29 of slot 17.

Such a device operates in the following manner: when the user wishes to change the height of the light beam emitted by headlight 1, he manipulates adjustment screw 23, which translates horizontally with swivel ball 24, thus moving attachment and hinging component 5.

Headlight 1 then pivots around swivel ball 21 provided for this purpose. Headlight 1, and more specifically bracket 16, defines a circle arc around swivel ball 21, which can be broken down into a horizontal component given by the movement of adjustment screw 23 along its axis, and a vertical component offset by the vertical translation of attachment and hinging component 5 in slot 17. Any risk of deformation of the parts comprising the adjustment device is eliminated, as is the risk of the jamming of said device.

The description provided herein as an example applies to the vertical adjustment of the light beam, but such a device can obviously be applied to the horizontal adjustment of the beam and/or the adjustment of the height using two adjustment screws 23.

What is claimed is:

1. In an assembly for adjusting the position of an optical element body such as a motor vehicle headlight with respect to a fixed support part, the assembly including an adjustment screw mounted in said fixed support and which is adapted to be threadably adjusted with respect to the fixed support part and which has formed at one end thereof a swivel joint connected to one side of the optical element body, pivot means connecting another side of said optical element body with said fixed support part, said swivel joint including an attachment and hinging component having a base and a concave seat engagable with a ball section of said adjustable screw and adapted for pivotal movement relative thereto upon adjustment of said adjustment screw, said base being slidably receivable in a slot formed in said optical element body and extending substantially perpendicular to the axis of said adjustment screw and having lateral edges, said base having two rectilinear and mutually parallel grooves engagable with said lateral edges of said slot for guiding said attachment and hinging component in translation during adjustment of said adjustment screw with respect to the fixed support part to pivot said optical element body about said pivot means.

2. The improvement according to claim 1, wherein said concave seat and said base are integrally formed as a single unit during the same molding operation.

3. The improvement according to claim 1, wherein said slot is formed in a bracket which is integrally formed as a unit with a reflector of said optical element body.

4. The improvement according to claim 3, wherein said attachment and hinging component is receivable in said slot through a widened extension of said slot extending perpendicularly to said slot on a lateral panel of said bracket.

5. The improvement according to claim 4, wherein the width of said base is greater than that of said slot and less than or equal to that of said widened perpendicular extension in said lateral panel of said bracket.

* * * * *